Nov. 16, 1965  C. CASEY  3,218,534
ELECTROMAGNETIC LINEAR POSITIONING APPARATUS
Filed March 29, 1965  2 Sheets-Sheet 1
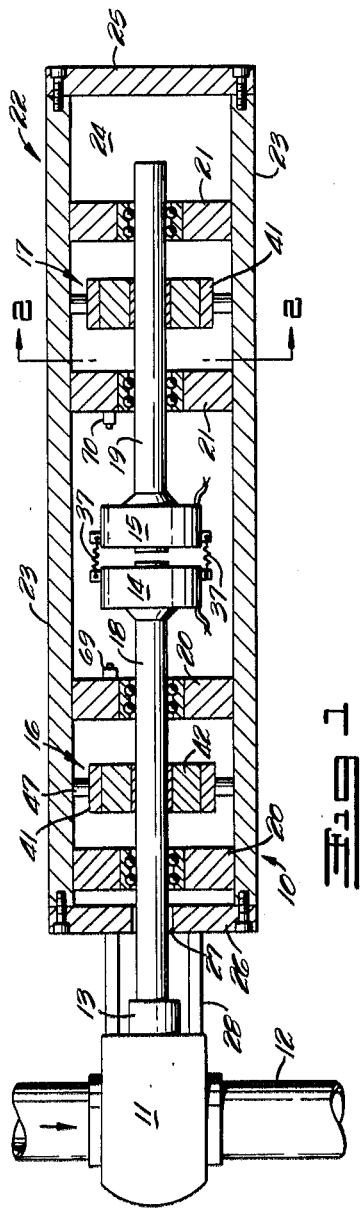
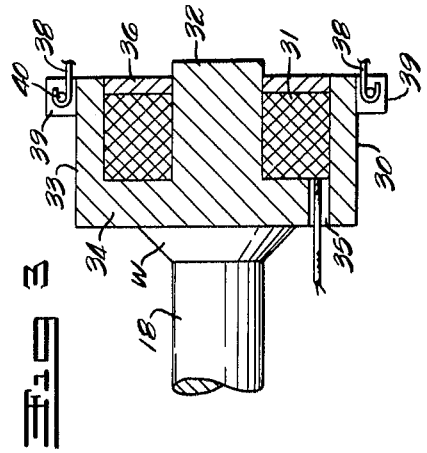
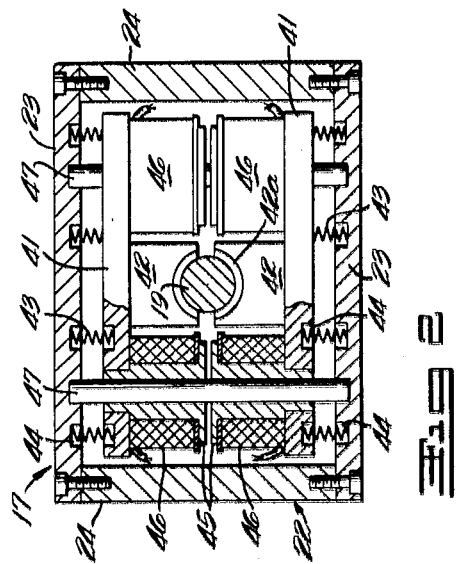
INVENTOR.
CULLEN CASEY
BY MAHONEY, MILLER & RAMBO
BY *Wm. V. Miller*
ATTORNEYS

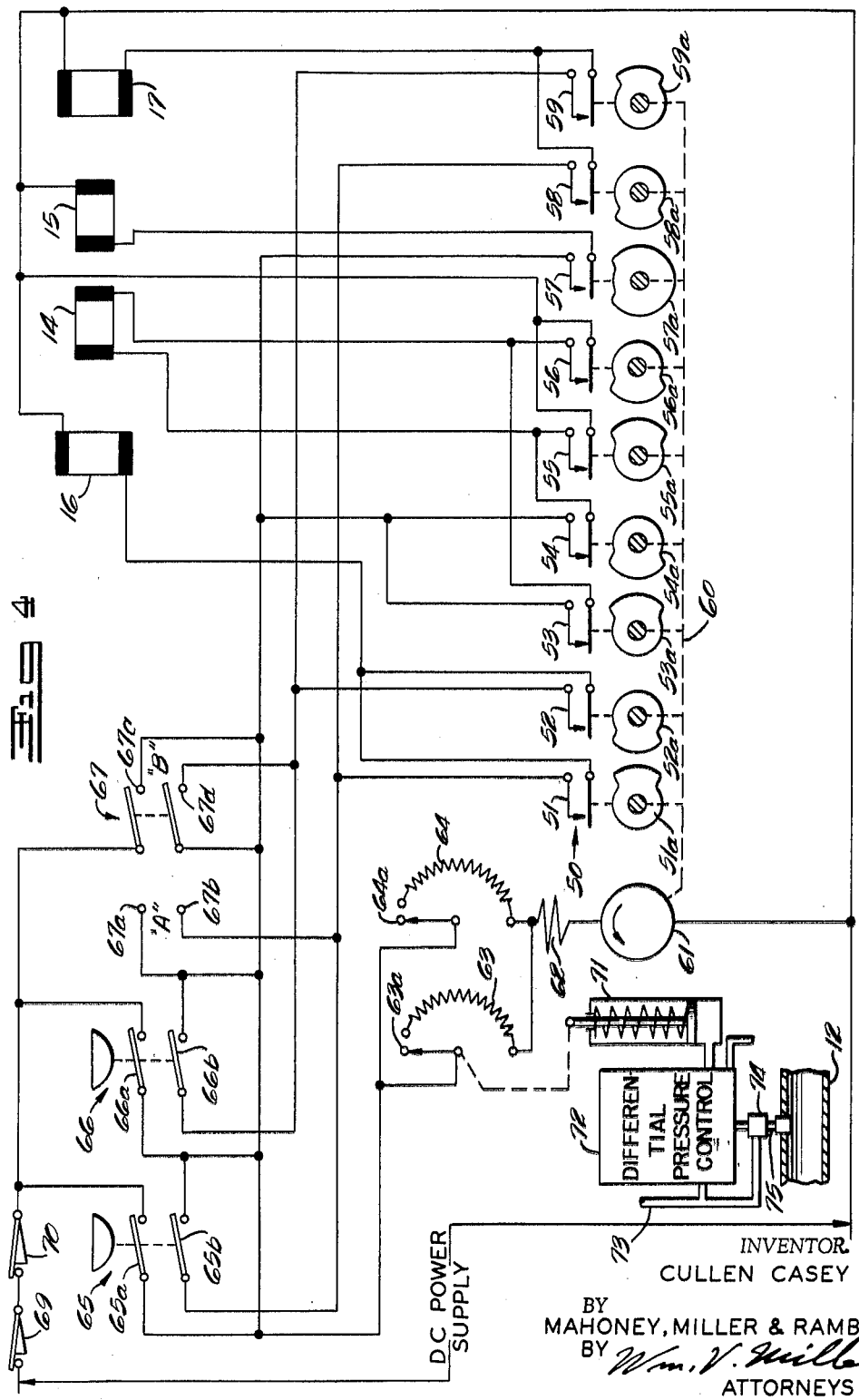

United States Patent Office 3,218,534
Patented Nov. 16, 1965

3,218,534
ELECTROMAGNETIC LINEAR POSITIONING
APPARATUS
Cullen Casey, Florence, Italy
(2045 Cranston St., Cranston 9, R.I.)
Filed Mar. 29, 1965, Ser. No. 443,585
6 Claims. (Cl. 318—135)

This application is a continuation-in-part of my co-pending application Serial No. 256,401, filed February 5, 1963, now abandoned.

This invention relates, in general, to positioning apparatus. It relates, more specifically, to an electromagnetic positioning apparatus for selectively actuating a positionable mechanism.

Many industrial processes or operations are dependent on actuators or positioners for the remote or automatic operation of various control mechanisms. The utilization of such actuators or positioners is particularly important where automation is a primary factor in economic operation. An example of their application is in the processing and distribution of large quantities of fluids through conduits or pipe lines as in the petroleum industry. Valves of many types and sizes are interposed in the conduits and pipe lines for fluid flow control and are generally intermittently actuated to control the process or the distribution of the fluid. It has been the practice heretofore to utilize the well-known solenoid type actuator or the electric geared-motor units for the remote or automatic control functions. Design limitations have generally restricted the utilization of the solenoid type actuators to relatively small valves having a short stroke and low electrical operating power requirements. Solenoids are designed for most efficient operation with a relatively short linear stroke due to the practical limitations of designing apparatus utilizing electromagnetic fields. Electric geared-motor units, however, have been primarily utilized for operation of relatively large size valves which are characterized by large power requirements or by a movable valve or gate member requiring a large amount of motion to move between a closed and an open position. Although capable of actuating any size of valve, electric geared-motor units utilize components which have a relatively high initial cost economically preventing use in conjunction with small valves. Also, each unit includes several moving and rotating parts which increases wear and requires frequent inspection and maintenance to attain satisfactory operation. A disadvantage of the usual solenoid type is that there is no control over the valve other than fully closed or fully open with an interchange of position which is substantially instantaneous. The effects of such operation are particularly detrimental to the apparatus where highly pressurized fluids are encountered.

It is, therefore, the primary object of this invention to provide a positiioning apparatus utilizing electromagnets to provide the necessary displacing force and which is readily adaptable for operation with all sizes of positionable mechanisms.

It is another object of this invention to provide a positioning apparatus utilizing electromagnets to provide the necessary displacing force and which is selectively operable to provide a positive displacement in either of opposite directions and to control the extent of the displacement.

It is a further object of this invention to provide a positioning apparatus utilizing electromagnets to effect relative displacement of a pair of shaft members which may be mechanically coupled to a positionable mechanism and having cooperatively operable braking means for selectively restricting displacement of the shafts to effect a positive displacement thereof in either of opposite directions.

It is also an object of this invention to provide a positioning apparatus utilizing electromagnets to provide the necessary displacing force and which may be fabricated with relatively few moving parts for economical manufacture and for simplification in operation.

These and other objects and advantages of this invention will be readily apparent from the following detailed description and the accompanying drawings.

In the drawings:

FIGURE 1 is an elevational view of an embodiment of the positioning apparatus showing a selectively positionable fluid valve coupled thereto.

FIGURE 2 is an enlarged vertical sectional view of a shaft braking means taken along line 2—2 of FIGURE 1.

FIGURE 3 is an enlarged axial sectional view of the shaft-displacing electromagnets.

FIGURE 4 is a schematic diagram of the electrical and pneumatic control system.

Having reference to the drawings, an embodiment of the positioning apparatus of this invention is shown in FIGURE 1 as incorporated in a valve positioning apparatus. This specific application is intended for illustrative purposes only and it is not to be considered as a limitation on the application of the invention. The positioning apparatus, designated generally by the numeral 10, is rigidly attached by a suitable means to the body of a fluid control valve 11. The valve 11 is interposed in a fluid conduit 12 in which the direction of flow is indicated by the arrow placed on the conduit. Although not shown in detail, the valve 11 is provided with a suitable flow control means such as a reciprocally movable gate having an actuating stem 13. The operation of the valve is controlled by linear displacement of the stem 13 between an innermost position where the gate is closed preventing fluid flow and an outer position where the gate is fully open allowing unrestricted flow through the valve 11. It will be readily apparent from consideration of the example shown in FIGURE 1 that the present embodiment of the invention may be readily applied to other types of valve structures or to other mechanisms which may require linear displacement of an actuating element.

In the present illustrative application, it is assumed that the fluid conduit 12 downstream of the valve 11 is connected with a multiplicity of outlets which are independently operable and it is the function of the apparatus to maintain a substantially constant pressure in the downstream conduit regardless of the flow through the outlet ports. This regulation of the pressure in the downstream portion of the conduit 12 is accomplished through operation of the valve gate to adjust the rate of fluid flow through the valve 11. A decrease of fluid pressure in the conduit 12 occasioned by an increase in the outflow through the outlets requires opening of the valve to increase the flow. Conversely, an increase of fluid pressure occasioned by a reduction in the outflow of fluid will require closing of the valve 11 to reduce the fluid flow.

The positioning apparatus 10 shown in FIGURE 1 may be selectively actuated by either an automatic control apparatus or a manually operated control apparatus to obtain the desired displacement of the actuating stem 13 and gate of the valve 11. Displacement of the actuating stem 13 is effected by means of a pair of selectively opperable electromagnets 14 and 15 and the independently operable braking means 16 and 17. Each of the electromagnets 14 and 15 is mounted on the end of a respective shaft 18 and 19. The shafts 18 and 19 are coaxially aligned with each of the shafts being supported by a pair of journals 20 and 21, which permit axial displacement of the shafts in either direction. The pairs of journals 20 and 21 are carried within a rigid-frame housing 22 with the journals in each pair being relatively spaced apart to provide adequate bearing for the respective shaft for maintaining the shafts in coaxial alignment.

The housing 22 may be formed, as may be seen in FIGURE 2, from pairs of flat steel plates 23 and 24 to form an elongated, tubular structure having a rectangular, cross-sectional shape. One end of the housing 22 is closed by an end plate 25 while the opposite end is substantially closed by an end plate 26 having an aperture 27 through which the shaft 18 may project. The length of the housing 22 is determined by the specific application and construction of the apparatus to accommodate the linear displacement of the shaft 19 to form a completely closed and protected unit. If desired, the aperture 27 in the end plate 26 may be provided with a suitable stuffing-box to prevent the passage of fluids therethrough. Attachment of the housing 22 to the body of the valve 11 is through a suitable mounting adaptor 28. Each of the journals, 20 and 21, may be secured to the top and bottom plates 23 of the housing.

Each of the electromagnets 14 and 15 are of similar construction and comprise a magnet core 30 and a magnetizing coil 31. Referring to FIGURE 3, the magnet core 30 is seen to include a central pole piece 32 of cylindrical cross section and an annular sleeve 33 which are interconnected by a web 34. The magnet core 30 is preferably formed by a suitable casting or forging process which provides a unitary structure having an annular cavity for receiving the magnetizing coil 31. The core 30 is mounted on the respective shaft 18 or 19 with the pole piece 32 in coaxial alignment therewith. Attachment may be by any suitable means such as welding W to obtain a rigid structure. The coil 31 comprises a suitable number of turns of an electrical conductor for the particular magnetizing current to be utilized in a specific application with the terminal ends of the conductor being brought out of the core 30 through an aperture 35 formed in the web 34. The coil 31 is circularly wound to effect magnetization of the pole piece 32. A protective end plate 36 is positioned, as by a press fit, in the open end of the cavity in which the coil 31 is disposed to maintain the coil in its desired position and provide protection therefore. The plate 36 is fabricated from a nonmagnetic material to prevent forming a low-reluctance magnetic circuit from the terminal end of the pole piece 32 and the annular sleeve 33. Each pole piece 32 is preferably of a length to project slightly beyond the end plate 36 and the annular edge of the sleeve 33. Thus, the end of the pole piece 32 of one electromagnet will be enabled to contact the pole piece of the opposite electromagnet without contact between other parts.

As previously indicated with reference to FIGURE 1, the electromagnets 14 and 15 are mounted on the adjacently disposed terminal ends of the respective shafts 18 and 19 with the shafts 18 and 19 relatively positioned to place the ends of the pole pieces 32 in close proximity to permit interaction of the magnetic fields. The electromagnets may be selectively energized to alternately attract and repel each other and thereby effect the relative linear displacement of the shafts 18 and 19 for the desired operation of the valve 11. Since effective operation of the electromagnets requires that the magnets be maintained within relatively close proximity for interaction of the magnetic fields, suitable restraining means 37 are provided to prevent displacement of the shafts and associated electromagnets 14 and 15 beyond a predetermined maximum. In the present embodiment, the restraining means comprises a pair of springs 38 which are connected at their respective ends to the opposite electromagnets 14 and 15. Each of the magnet cores 30 is provided with at least two pairs of ears or lugs 39 integrally molded or formed on the exterior of the sleeve 33 to which the hook-form ends of the springs 38 may be attached by the pins 40.

The braking means 16 and 17 are operated in cooperation with the electromagents 14 and 15 to effect the linear displacement of the shafts 18 and 19. Each braking means 16 and 17 is selectively and independently operable, as will be more fully explained hereinafter, to permit the magnetic attraction or repulsion of the electromagnets 14 and 15 to effect the relative displacement of the respective shafts 18 and 19. In the present embodiment, each braking means is mechanically biased into braking relationship with the respective shaft by mechanical springs and is electrically actuated to release the shaft.

Referring to FIGURE 2, one of the braking means, 16 or 17, is shown in detail and is seen to comprise two electromagnet structures which cooperate to release the respective shaft and permit axial movement of the shaft. Each of the electromagnet structures of the braking means includes an elongated cross plate 41 which extends transversely of the housing 22 in spaced, parallel relationship to the respective top or bottom plate 23. Carried by each of the cross plates 41 is a brake shoe 42 having an end face shaped to fit around a portion of the respective shaft 18 or 19. The end face is preferably provided with a frictional facing material which forms a brake lining 42a. Interposed between each of the cross plates 41 and the respective upper or lower plate 23 of the housing are a number of compression springs 43. The springs 43 normally bias the cross plate 41 and the respective brake shoe 42 into braking relationship with the respective shaft. Opposed sockets 44 are formed in the cross plates 41 and the plates 23 of the housing to receive the terminal ends of the springs 43 and thereby maintain the springs in their desired positions. Carried at each end of the respective cross plates 41 is a magnet core 45 and associated magnetization coil 46. Each of the cores 45 is secured by suitable means to its respective cross plate 41 and is coaxially aligned with the core mounted on the opposite cross plate with each of the cores being formed with a pole face. A coaxial aligned bore is formed in each pair of opposed cores 45 to slidably receive a guide rod 47. The ends of each guide rod 47 are secured in the top and bottom plates 23 of the housing and thus maintain the electromagnet structures in alignment for proper operation. Each of the magnetization coils 46 is wound on a respective core 45 to form opposed magnetic fields when energized by a suitable electrical current. As is well known, the opposing magnetic field may be obtained by either winding the opposing coils in opposite directions or by energizing the opposing coils through connection to electrical power sources of the direct-current type having opposite polarity. Preferably, the pole faces of each opposed set of cores 45 are separated by an air gap when the brake shoes 42 are in clamping relationship to the respective shaft. This assures effective operation of the brake shoe through the operation of the biasing springs 43. Energization of the coils 46 produces opposing magnetic fields which result in a repulsion force causing the electromagnet structures to separate and thereby disengage the brake shoes 42 from the respective shaft.

Linear displacement of the shafts 18 and 19 and the resultant actuation of the valve stem 13 is obtained through selective operation of the electromagnets 14 and 15 and the braking means 16 and 17. The basic operation of the apparatus may be briefly explained with reference to the structure shown in FIGURE 1. Assuming that the actuating stem 13 is in a first position where the valve 11 is at least partially open and it is desired to close the valve thereby reducing the fluid flow therethrough, the shaft 18 must be displaced toward the left of the figure. To effect this displacement, the braking means 16 is first operated to release the shaft 18 for axial movement through disengagement of the brake shoe 42 from the shaft. Subsequent to the energization of the braking means 16, electromagnets 14 and 15 are energized to produce respective magnetic fields which are of opposing relationship and produce a repelling force. With the shaft 18 thus freed for axial movement, the repelling force between the magnets 14 and 15 will displace the shaft 18 toward the left of FIG- URE 1 to the extent that the repelling force is effective and displace the valve actuating stem 13. The linear displacement of the shaft 18 is not readily determinable but is dependent on the resistive force of the valve 11, the opposing force of the motion-restricting means 37 and the mass of the system as well as the force produced by the electromagnets. At this time, the braking means 16 is deenergized to permit the brake shoes 42 to again engage the shaft 18 and restrict further axial movement of the shaft 18. After deenergization of braking means 16, the electromagnets 14 and 15 are energized to produce respective magnetic fields which are mutually attractive and thereby tend to draw the electromagnets and shafts 18 and 19 together. However, the shafts 18 and 19 will not draw together at this time since both braking means 16 and 17 are deenergized and are in engagement with the respective shafts 18 and 19 to prevent their relative axial displacement. Energization of braking means 17 will disengage the respective brake shoes 42 from the shaft 19 to permit axial displacement of the shaft. Since the electromagnets 14 and 15 are energized to produce mutually attractive magnetic fields, the shaft 19 will be displaced toward the left of FIGURE 1 until the end faces of the pole pieces 32 of the magnets 14 and 15 are in contact. For each cycle of operation, through appropriate design of the apparatus and specification of the electrical operating characteristics, a specific apparatus will be capable of effecting a desired displacement. Subsequent to the displacement of the shaft 19, the braking means 17 is deenergized and the brake shoes 42 will engage the shaft 19 to prevent further axial displacement. This completes a cycle of operation and the sequence of events may be repeated to effect a further displacement of shaft 18 with the number of cycles being determined by the total displacement required.

Displacement of the shafts in the opposite direction is accomplished in substantially the same manner except that the sequence of operation of the braking means 16 and 17 is reversed. The braking means 16 and 17 would be energized in transported relationship in the cycle relative to the alternate energization of the electromagnets 14 and 15 to obtain the alternately attracting and repelling magnetic fields.

Although the operation of each of the electromagnets 14 and 15 and braking means 16 and 17 could be manually accomplished through sequential energization of each of the electromagnets by connection to a suitable power source, the operation of the positioning apparatus is preferably controlled by an automatic electrical control system. A relative simple automatic control system for the operation of the positioning apparatus is shown in FIGURE 4. This apparatus provides for both remote operation and manually selected operation. The particular type of operation, whether remote or manual, does not alter the operation of the positioning apparatus as the functions are identical and the operation proceeds in the manner as briefly described hereinbefore. In the schematic diagram of FIGURE 4, the electromagnets 14 and 15 are shown by conventional symbols indicating the end-to-end, opposed relationship of the magnets. The electromagnet structures of each of the braking means 16 and 17 are combined in a single symbol since the operation or the energization of the coils 46 are simultaneous and the coils may be either series or parallel connected as the case may be. The effect, however, is of a single coil and such a single coil is illustrated by a conventional coil symbol to provide a vertical operation relative to the attracting or repelling forces of the electromagnets 14 and 15.

Providing the sequential energization of the respective coils of the electromagnets 14, 15, 16, and 17 is a motor-driven, multi-contact, cam-actuated switch mechanism indicated generally at 50. The switch mechanism 50 comprises nine normally open switches numbered 51 through 59 which are each operated by the respective cams 51a through 59a. The cams 51a through 59a are mounted on a common shaft which is indicated by the broken line 60 and which is connected to a driving motor 61. Each of the cams is formed with a cam-lobe for actuating the associated switch in a predetermined sequence. The sequence of actuation is relatively indicated by the diagrammatic shape of the respective cam lobes and their relative positions. The motor 61 is preferably of a variable speed type, such as the well-known direct current, series-connected field coil type. A field coil 62 is shown as series connected to the armature symbol 61. Speed control of the motor 61 is effected through a suitable rheostat, 63 or 64, connected in series with the field 62.

Energization of the motor 61 for operating the cam-operated switches is effected through either of the double-pole, single-throw, fluid pressure actuated switches, 65 and 66, or the manually operated double-pole, double-throw switch 67. Each of the switches includes one terminal which is series-connected to the positive voltage line of a suitable voltage, direct-current, electrical power supply. One pole of each of the switches 65, 66 and 67 are connected in shunt relationship and each switch will, therefore, be capable of operating the motor 61 independently of each of the other switches.

As a safety feature to prevent damage to the positioning apparatus, a pair of normally closed, limit switches 69 and 70 are interposed in series-connected relationship in the input power supply line. The limit switches 69 and 70, referring to FIGURE 1, are attached to the respective adjacent journals 20 and 21 and are located to contact the respective electromagnets 14 and 15 when the magnets and the respective shafts 18 and 19 are displaced toward the respective journal 20 or 21. At any time that the respective electromagnets 14 and 15 reach the limit of their linear displacement, the respective limit switch 69 or 70 will open and deenergize the control circuit.

The pressure switch 65 is designed to be responsive to a pressure condition wherein a fluid pressure exceeding a predetermined value will effect closing of its contacts. Accordingly, the actuating element of the switch 65 is connected in fluid communication with the conduit 12 downstream from the valve 11. The pressure switch 66 is similarly connected to the conduit 12 but is designed to be responsive to a pressure condition wherein a decrease of fluid pressure in the conduit below a predetermined value will effect closing of its contacts. The manually operated switch 67 is connected in circuit with the pressure switches 65 and 66 to perform the same function. When the poles of switch 67 are placed in position A to complete a circuit, the functions of the high pressure switch 65 will be performed while position B is associated with the low pressure switch 66.

For illustrative purposes, it is assumed that it is desired to actuate the gate of the valve 11 to restrict the flow of fluid and thereby effect a reduction in pressure. The operation of the electrical control circuit will now be described for this condition with utilization of the manually-operated switch 67. In this instance, the pressure switches 65 and 66 will be inoperative. Operation of the apparatus by means of remote switch 65 for this pressure condition will be subsequently described in detail. In the descriptions of the operation of the apparatus, it will be assumed that the limit switches 69 and 70 will remain closed. As previously explained, their operation would merely disconnect the entire electrical circuit from the power supply and discontinue operation of the apparatus.

Operating switch 67 to close the contacts in the A position completes a circuit through the terminal 67a to the rheostats 63 and 64. Since the manual operation is to be described, rheostat 63 will be disregarded at this time. At the initiation of the operation, the movable slider of the rheostat 64 will be resting on a dead terminal 64a and the motor 61 will not be energized. At the same time, a circuit will be completed through 67b of the switch to a terminal of the cam-actuated switches 51 and 58. A circuit will also be completed through terminal 67a to a terminal of the cam-actuated switches 53, 54 and 57.

Assuming that each of the cams 51a through 59a are in the illustrated positions, the respective switches 51 through 59 will also be open, as indicated. In this condition, none of the electromagnets in the positioning apparatus will be energized and the shafts 18 and 19 will remain fixed in position. Manually turning the slider arm of the rheostat 64 to contact the resistance thereof will energize the motor 61 through its field coil 62 and will thus rotate the cams 51a through 59a in a counterclockwise direction. The function of the rheostat 64, and of rheostat 63 in the remote controlled operation, is to permit variation or adjustment of the speed of the motor 61 as may be desired. With a large pressure differential in the fluid system, it is of considerable advantage to operate the cams at a faster rate to increase the rate of displacement of the positioner. However, as the pressure differential decreases, it is desirable to reduce the speed of the motor 61 and thereby reduce the rate of displacement of the shafts 18 and 19 to prevent overshooting the desired position.

Upon closing of the switch 67 and adjustment of the rheostat 64 to obtain the desired speed of the motor 61, the switch mechanism 50 will operate to automatically sequence the electromagnets 14 and 15 and braking means 16 and 17 to effect the desired displacement of the shaft 18. For this operation, it will be seen that cam 53a will close its switch 53 and cam 55a will close its switch 55 to complete a circuit through the electromagnet 14. Simultaneously, cam 57a will close its switch 57 to complete the circuit through electromagnet 15. At this time, neither braking means 16 or 17 will be energized and the shafts 18 and 19 will be held in fixed position. Subsequent to the energization of electromagnets 14 and 15, cam 51a will close its switch 51 to complete a circuit to braking means 16 resulting in disengagement of the brake shoes from the shaft 18. Although cam 59a will also close switch 59, braking means 17 will not be energized since the B position of switch 67 will be open. With the respective electromagnet coils of the magnets 14 and 15 appropriately connected, repelling magnetic fields will be formed between the two electromagnets which will produce a relative axial displacement of shaft 18 to the left of FIGURE 1. This will result in displacing the actuating stem 13 of the valve to close the gate and further restrict the flow of fluid therethrough.

After a predetermined time interval, as determined by the particular design of the cam lobe, cam 51a will be rotated to a position where switch 51 will open and the electromagnets of braking means 16 will be deenergized and the shaft 18 will again be braked or clamped to prevent further axial movement. Subsequent to the opening of switch 51, cams 53a and 55a will also be rotated to a position where the respective switches 53 and 55 will open resulting in the deenergization of the electromagnet 14.

Continued rotation of the cams will result in closing of switches 54 and 56 by the respective cams 54a and 56a. The result of closing switches 54 and 56 is to again energize electromagnet 14. However, the polarity will be reversed providing a magnetic field which is mutually attracting to the magnetic field produced by magnet 15. Subsequent to the closing of switches 54 and 56, cam 58a will have rotated to a position closing the respective switch 58 and complete a circuit to the electromagnetic structure of braking means 17. Energization of the electromagnets of braking means 17 will result in release of the shaft 19. Shaft 19 will thus be free to move and will be displaced through the magnetic attraction of magnets 14 and 15 to the left of FIGURE 1 until the end surfaces of the pole pieces 32 come into contact. The cams will continue to rotate and the switches 54 and 56, 57 and 58 will subsequently open to complete the cycle of operation. It will be noted that switch 58 will open slightly before switches 54 and 56 open to permit braking means 17 to return to its normal clamping relationship with respect to shaft 19.

The positioning apparatus will be locked in the last position attained during the operation and thereby maintain the valve stem 13 in that position. This locking operation automatically results when switch 67 opens as the electromagnets of braking means 16 and 17 will be deenergized and the springs will apply the brakes.

A reverse operation in which it is desired to displace the shafts 18 and 19 in the opposite direction or to the right of FIGURE 1, will proceed substantially as described with the exception switches 52 and 59 will be connected in circuit with the power source to energize the braking means 16 and 17 in relatively transposed positions in the cycle sequence. This alteration in the sequence of operation of the switches 51 through 59 will effect the selective displacement of the shafts 18 and 19. Such a reverse operation may be accomplished by placing the switch 67 in the B position which completes circuits to the cam operated switch through terminals 67c and 67d. Terminal 67d connects with switches 52 and 59 to effect the transposed operation of braking means 16 and 17.

The remote automatic operation of the control apparatus is effected through means which is responsive to a differential in pressure and which is capable of detecting whether the pressure in the conduit 12 is above or below a desired pressure. The switches 65 and 66 are pressure-operated having a control element connected to the conduit 12 so as to be responsive to the pressure of the fluid therein. Each of the switches 65 and 66 includes a pole, 65a and 66a, which are each connected to energize the rheostats 63 and 64. Rheostat 64 is manually operated and will be considered to remain in the illustrated inoperative position and switch 67 will also be open. The rheostat 63 is similar to the manually-operated rheostat 64 and functions in an identical manner. In addition, the poles 65a and 66a operate to connect a terminal of the switches 53, 54 and 57 to the power supply. The second poles 65b and 66b of switches 65 and 66 are connected to complete a circuit to switches 51, 58 and 52, 59, respectively.

The operation of the switch mechanism 50 will be as previously described in connection with the operation of the manual switch 67 and will, therefore, not be further described in connection with the remote automatic operation. The pressure-actuated switches 65 and 66 are especially designed to detect the high pressure and the low pressure relative to the desired normal pressure. With the condition as previously described, that is a high pressure in the fluid conduit 12, switch 65 will be actuated to close its contacts while switch 66 will remain open. Control of the rheostat 63 is effected through a pneumatic mechanism illustrated in FIGURE 4 which comprises a piston and cylinder actuator 71 and a differential pressure control 72 of a type which is well known and commercially available. The actuator 71 is preferably of the spring-biased type having the piston rod connected to the slider of the rheostat 63. In a situation where the cylinder is not under pressure, the spring will maintain the slider on a dead terminal 63a of the rheostat 63 and the motor 61 will be disconnected from the circuit to prevent operation of the switch mechanism 50.

An increase in pressure of the fluid within the conduit 12 is transmitted through a tube 75 to the differential pressure control 72 which is also connected to a pressurized air supply indicated at 73. A difference in pressure as detected by the differential pressure control 72 will result in pressurization of the cylinder 71 by the air supply 73 to an extent which is proportional to the difference in pressures. Thus, the slider of the rheostat 63 will be displaced proportionally to the deviation of the pressure within the conduit 12 from a desired normal pressure. Consequently, as the positioning apparatus is operated to close the valve 11, the speed of the motor 61 will be gradually reduced to prevent overshooting the desired pressure.

In the instance where the pressure within the conduit 12 is below the normal desired pressure, it is first necessary to convert the pressure signal to a proper base for operation of the differential pressure control 72. This is accomplished by means of a pressure transducer 74 such as the type that is commercially available and is interposed in the pressure-transmitting tube 75 interconnecting the conduit 12 with the differential pressure control 72. The pressure transducer 74 also includes a connection to the standard or reference pressurized air supply 73. The pressure transducer is of no effect where the conduit pressure is above normal; however, the transducer will operate to produce a reciprocal proportional pressure signal when the conduit pressure has decreased to below normal. The input pressure differential to the pressure differential control 72 will thus be the same regardless of the absolute value and will control the operation of the piston and cylinder actuator 71 and the rheostat 63 connected therewith. The pressure switches 65 and 66 are not affected by the transducer 74 and, in this instance, switch 66 will be actuated with the same effect on the operation of the apparatus as briefly described in connection with closing of the switch 67 in the B position.

The positioning apparatus of this invention has been disclosed in detail in connection with a specific embodiment for a particular application. It will be apparent that this particular disclosed application is not a limitation and that the positioning apparatus may be readily adapted to other applications with only such obvious structural modifications as may be necessary. It will also be apparent that while the disclosed apparatus is designed to provide linear displacement of a movable mechanism, rotative motion may be obtained through well known mechanical linkages or by obvious structural modifications of the apparatus. Also, the control system disclosed is merely illustrative and may be changed or modified as required for a particular application.

It is readily apparent that the positioning apparatus of this invention is particularly capable of selectively actuating a positionable mechanism in either of opposite directions. The apparatus may be ruggedly constructed and provides a positive displacement. The operation thereof is simple and may be controlled by simply operated control systems.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A positioning apparatus comprising a pair of axially disposed shafts supported for relative movement and movement relative to a fixed reference, a pair of electromagnets carried by said shafts with each electromagnet being rigidly attached to a respective shaft, said electromagnets being relatively disposed to form cooperative electromagnetic fields when energized, electrically-actuated braking means adapted to releasably engage each of said shafts and prevent movement thereof relative to said fixed reference, and control means electrically connected to said electromagnets and to said braking means for selectively energizing said electromagnets to create alternately attracting and repelling magnet fields therebetween and to selectively actuate said braking means in cooperation with the energization of said electromagnets to move said shafts relative to said fixed reference.

2. A positioning apparatus comprising a pair of axially disposed shafts supported on bearing members for movement relative to each other and to a fixed reference, a pair of electromagnets carried by said shafts with each electromagnet being rigidly attached to a respective shaft, said electromagnets being arranged with the magnetic field axes thereof disposed coaxially forming cooperative magnetic fields when energized to move said electromagnets and their respective shafts relative to each other, braking means adapted to releasably engage each of said shafts and prevent movement thereof relative to said fixed reference, and control means electrically connected to said electromagnets and to said braking means which is selectively operable to energize said electromagnets to produce relative motion thereof in a predetermined direction and to actuate said braking means in cooperation with energization of said electromagnets to move said shafts relative to said fixed reference.

3. A positioning apparatus comprising a pair of axially disposed shafts supported for movement relative to each other and to a fixed reference, a pair of electromagnets carried by said shafts with each electromagnet being rigidly attached to a respective shaft, said electromagnets being disposed to form cooperative magnetic fields when energized to move said electromagnets and their respective attached shafts relative to each other, braking means adapted to releasably engage each of said shafts and restrict movement thereof relative to said fixed reference, and control means electrically connected to said electromagnets and to said braking means, said control means being selectively operable to energize said electromagnets to produce relative motion thereof in a predetermined direction and to actuate said braking means in cooperation with energization of said electromagnets to move said shafts relative to said fixed reference.

4. A positioning apparatus according to claim 3 wherein said braking means includes a braking mechanism disposed in operative relationship to each of said shafts, each braking mechanism having a brake shoe adapted to engage a respective shaft and prevent movement thereof and electromagnet means coupled with said brake shoe for selective actuation thereof when energized.

5. A positioning apparatus according to claim 4 wherein said brake shoe is normally biased into braking engagement with the respective shaft and said electromagnet means is operable to effect disengagement thereof when energized.

6. A positioning apparatus according to claim 3 wherein said control means includes a switch mechanism for sequentially energizing said electromagnets and said braking means.

References Cited by the Examiner
UNITED STATES PATENTS 2,752,546   6/1956   Frisch     318—135
3,138,749   6/1964   Stibitz     318—135

ORIS L. RADER, *Primary Examiner.*